Dec. 11, 1934.  K. B. NORTON  1,983,768
ART OF REFRIGERATION
Filed Nov. 5, 1931   2 Sheets-Sheet 1
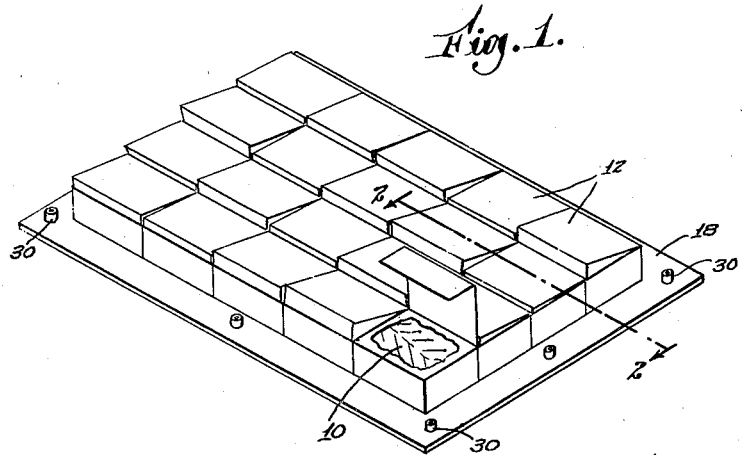
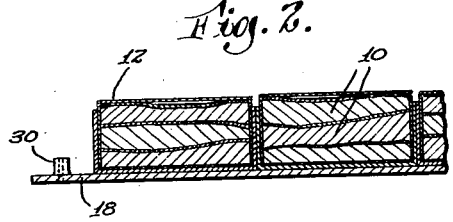
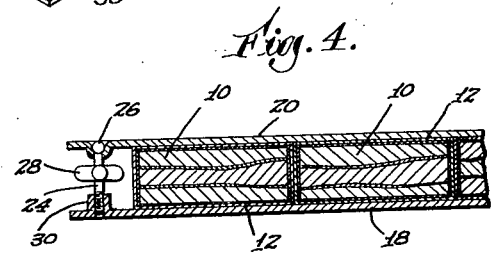
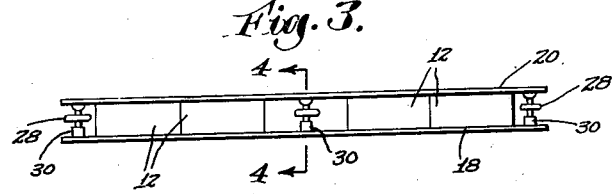
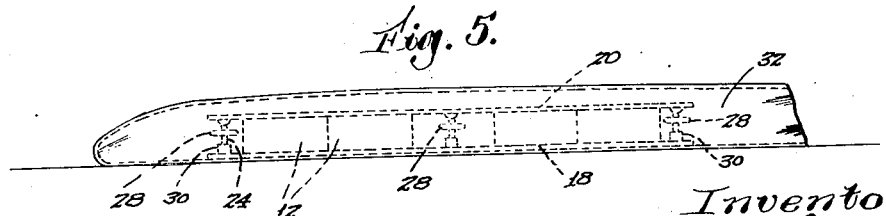
Inventor
Karl B. Norton
by Kenway & Witter
Attorneys Dec. 11, 1934.  K. B. NORTON  1,983,768
ART OF REFRIGERATION
Filed Nov. 5, 1931  2 Sheets-Sheet 2

Inventor
Karl B. Norton
by Kenway & Witter
Attorneys

UNITED STATES PATENT OFFICE 1,983,768

ART OF REFRIGERATION

Karl B. Norton, Manchester, Mass., assignor to Frosted Foods Company, Inc., Dover, Delaware, a corporation of Delaware Application November 5, 1931, Serial No. 573,163

12 Claims. (Cl. 62—104)

This invention relates to the art of freezing food products for purposes of preservation, storage and distribution. It consists in a novel process of handling any food product which it is desired to convert into congealed or frozen units, and includes within its scope an improved form of apparatus herein shown as particularly well adapted for use in carrying out such process.

In one aspect the invention consists in a process by which packaged food products may be quick-frozen efficiently by immersion in a liquid refrigerant, such as brine, but without direct contact therewith. Heretofore it has been the practice to quick-freeze packaged food products between refrigerated plates or bands and these have required extensive mechanical equipment for their refrigeration and operation. The process of the present invention is designed to reduce substantially the requirements of mechanical equipment as compared to that heretofore employed.

Broadly stated, the invention consists in a process of freezing, quick-freezing or congealing food products, including packaged food products, by immersion, while maintained on or between portable plates and protected by a flexible waterproof envelope. For carrying out such a process there is required only a tank of refrigerated brine, an assortment of portable plates and envelopes. The plates may be of any desired dimensions, depending upon the size of the charge to be handled, and may serve as a support for assembling the product, as a means for leveling and flattening it, and finally, as a means for maintaining it in the required shape during the freezing step so that the resulting units or packages shall be uniformly of the desired size and shape. Solid aluminum plates are entirely satisfactory for the purpose and present the advantages of lightness and high heat-conductivity, although any other metal may be employed.

Having assembled a number of units or packages of the more-or-less conformable food product upon one of the portable plates, a second similar plate is placed upon the assembly and secured in position, thus subjecting the product to pressure upon opposite faces thereof and tending to level all of the unfrozen packages uniformly to the spacing of the plates. Further, the product is compacted, voids are eliminated in the mass thereof and an extended surface contact insured between the product and the heat-conductive plates. Incidentally, the product units are held securely in position between the plates so that the whole assembly may be moved about and handled as a single member.

The next step of the process consists in enclosing the loaded plates in a flexible waterproof envelope, such for example, as a rubber bag. This may be drawn over the plates, preferably lengthwise thereof and is left open, at least partially, at its mouth. The result of this step is to envelop and protect the food product units which are interposed between the plates.

The actual freezing step is carried out by immersing the enclosed and protected assembly by lowering it into a stream or bath of refrigerated brine or the like. In this step the external liquid pressure causes the waterproof bag to collapse into intimate contact with the outer faces of the plates, the entrained air being expelled through the open mouth of the bag. At the conclusion of the freezing step the assembly is removed from the brine, the plates separated, and the individual frozen units or packages may be removed ready for storage.

I will now describe one preferred manner of carrying out the process of my invention, utilizing a novel form of apparatus which I have devised for the purpose, although it will be understood that the apparatus illustrated may be modified in many particulars to accommodate various different products.

Referring to the figures of the drawings,

Fig. 1 is a view in perspective of several food packages assembled and ready to be frozen in accordance with my invention;

Fig. 2 is a fragmentary sectional view, on an enlarged scale, on line 2—2 of Fig. 1;

Fig. 3 is a view in side elevation of an assembled unit;

Fig. 4 is a sectional view, on an enlarged scale, on line 4—4 of Fig. 3;

Fig. 5 illustrates the assembled unit of Fig. 3 enclosed within a collapsible covering in readiness for the freezing operation;

Figures 6, 7:
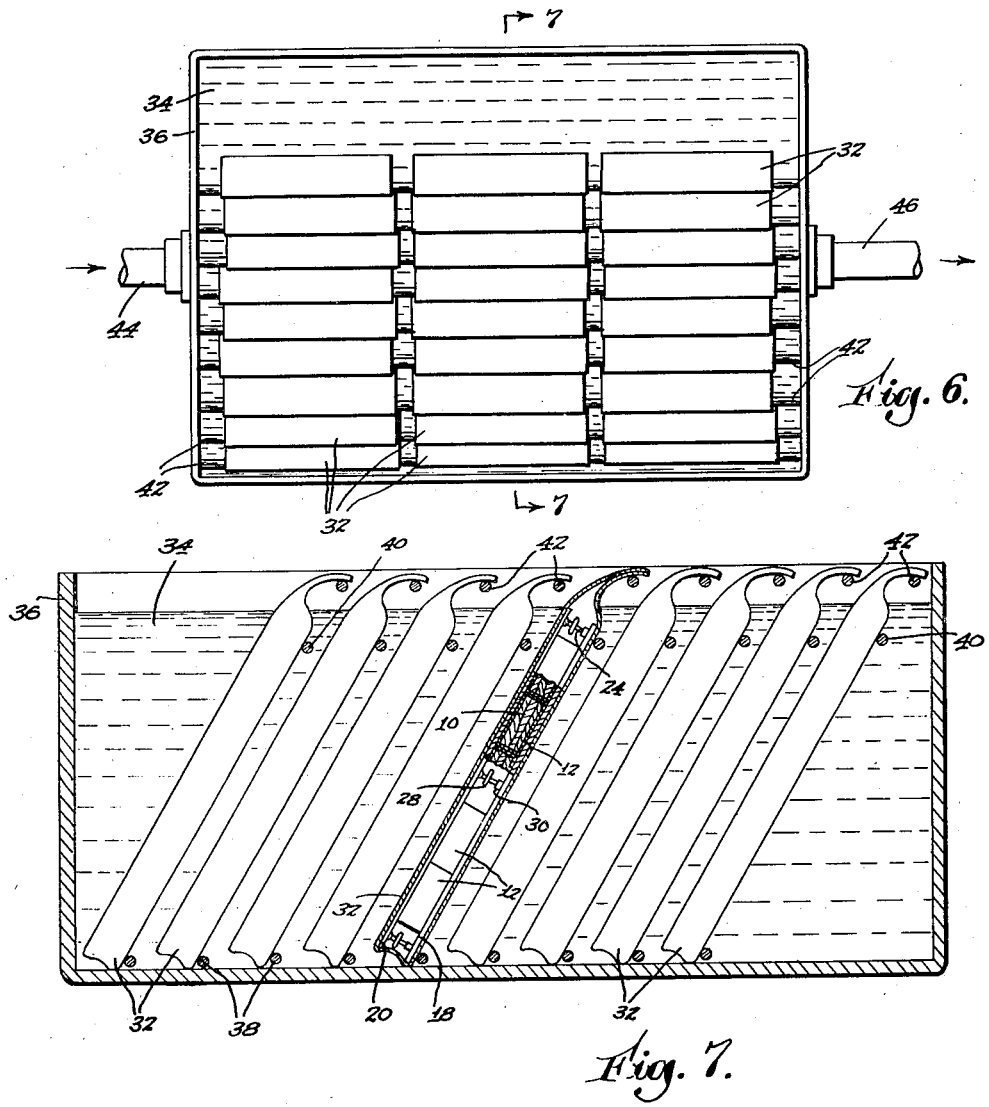
Fig. 6 is a plan view of a tank having the enclosed units of Fig. 5 submerged within.
Fig. 7 is an enlarged sectional view through the tank, taken on line 7—7 of Fig. 6.

My invention is especially applicable to the freezing of fresh fish products, and by way of example it is herein illustrated and described in this aspect. More specifically it is described in its application to the quick-freezing of a packed fish product in producing frozen marketable packages, although it will, of course, be understood that this specific description is given only by way of example and that the invention is by no means limited to the details set forth.

The fish product shown in Fig. 1 of the drawing comprises fish fillets or pieces of clear fish flesh 10 closely packed within suitable containers, such as the cardboard cartons 12, preferably waxed or otherwise rendered resistant to moisture. For further protection against losses by evaporation the cartons may be lined or their contents wrapped in moisture-proof cellophane or other moisture-proof sheet material and the carton itself may be sealed and similarly wrapped. The fillets 10 are of somewhat irregular shape and pliable or conformable to the carton so that they fill and conform to the shape of the carton forming a plane sided mass or cake except at their upper surface which is left somewhat irregular in its contour in the packing step of the process.

The cartons 12 having been packed and closed are assembled in convenient numbers on a loading or bottom plate, herein shown as a solid rectangular plate 18. This plate may be of any convenient size to receive the product and is herein shown as supporting twenty one-pound cartons. The top plate 20, which may be identical in size and shape to the plate 18, is next placed upon the assembled cartons. It is desirable, however, that the product shall be placed under a predetermined pressure before freezing, whereby the frozen product may be made compact, the irregular upper surface levelled and air spaces eliminated from the mass. The plates are, therefore, equipped with means by which they may be drawn toward each other and maintained in position of pressure with the product between them.

Depending from the edge portions of the top plate 20 are a plurality of clamping bolts 24 having swivelled connection with the top plate by rounded heads 26 and threaded at their lower ends. Hand wheels 28 are provided on the bolts for rotating the same and the bottom plate is provided with corresponding threaded bosses 30 for receiving the threaded portions of the bolts. When the two plates are brought together with the product between them the bolts are threaded into the bosses and turned in a manner drawing the plates toward each other to place a predetermined pressure on the product. The pressure thus imparted compacts the product into relatively solid blocks and levels the upper surface of the mass and brings all the cartons to uniform thickness.

When the plates have been drawn together and the product compressed therebetween in the manner described, the assembly thus formed may be treated as a unit in the freezing operation. This unit (Fig. 3) is placed within a collapsible water-tight covering, as the bag 32, of rubber or like flexible material, the bag being open only at one end. The enclosed units are then partially submerged in a liquid refrigerant 34 in a tank 36.

The refrigerant 34 may be brine or other suitable refrigerating medium and the tank is of a height to receive the units well therein. Extending longitudinally through the tank is a series of lower rods 38 and two cooperating series of upper rods 40 and 42 and the bags with the loaded plates therein are inserted within the tank and supported by the rods in the manner illustrated in Figs. 6 and 7, and preferably arranged at an angle to the vertical. The refrigerant is circulated through the tank by means of a supply pipe 44 and a discharge pipe 46, the enclosed units preferably being so arranged that the refrigerant flows along and in contact with their sides.

It will be understood that the plates 18 and 20, being in firm contact with the cartons 12, provide direct heat-conductive paths from both surfaces of the product to be frozen. It will also be noted that the bag, being entirely flexible and collapsible, is maintained by fluid pressure tightly in contact with the plates 18 and 20 thereby providing also a direct heat-conductive contact therebetween. Air entrained in the bag is forced out when the unit is submerged. Thus the cold circulating brine, without being permitted to come into contact with the product, has a direct heat-conductive path to the product whereby the latter is quickly frozen into solid and compact blocks. The upper open ends of the bags rest on the cross rods 42.

The units above described may be packed and assembled one by one and immersed in the bath or stream of liquid refrigerant as prepared. In many cases a continuous process may be followed as those units first submerged will have become solidly frozen by the time the tank has been filled to capacity. Under these circumstances an unfrozen unit may be immersed to replace each frozen unit as withdrawn. After having been withdrawn from the tank, the bag 32 is removed, the plates separated and the cartons with their frozen contents may be removed.

Having thus described my invention, what I claim as new and desire to secure by Letters Patent is:

1. A method of freezing food products, which consists in assembling the product between two heat-conductive plates, placing the assembly within a collapsible and water-tight covering, and submerging the enclosed assembly in a liquid refrigerant which presses the covering into contact with the plates.

2. A method of freezing food products, which consists in assembling the product on a metal plate, placing a second metal plate over the top of the product in a manner to engage the product between the plates, placing the combined plates and product within a collapsible and water-tight covering, and submerging the same in a liquid refrigerant which presses the covering into contact with the plates.

3. A method of freezing food products, which consists in assembling the product on a metal plate, placing a second metal plate over the top of the product in a manner to engage the product between the plates, drawing the plates together to subject the product therebetween to a predetermined pressure, placing the combined plates and product within a collapsible and water-tight covering, and submerging the same in a liquid refrigerant which presses the covering into contact with the plates.

4. A method of freezing food products, which consists in assembling the product on a metal plate, placing a second metal plate over the top of the product in a manner to engage the product between the plates, placing the combined plates and product within a collapsible and water-tight bag open at one end only, and submerging all but the open end of the bag in a liquid refrigerant which presses the bag into contact with the plates.

5. A method of packaging and preserving food products, which consists in first packing the product in the container in which it is to be marketed, placing a series of packed containers on a portable plate, placing a second plate over the top of the containers in a manner to engage the containers between the plates, placing the assembled plates and containers within a collapsible and water-tight covering, and submerging the same in a liquid refrigerant.

6. A method of packing and preserving relatively soft and pliable food products, which consists in packing the product in a flexible container, substantially hermetically sealing the container, compressing the container between portable heat-conductive plates with a predetermined pressure, placing the same within a collapsible and water-tight covering, and submerging in a liquid refrigerant.

7. A method of freezing food products, which consists in compressing a plurality of units thereof between portable flat plates, drawing a flexible waterproof bag lengthwise upon said plates, thereby enveloping the interposed units, immersing the assembly in liquid refrigerant, and permitting enclosed air to escape as the bag is collapsed upon the outer faces of the plates by the liquid pressure of the refrigerant.

8. Apparatus for freezing food products, comprising portable heat-conductive plates adapted to hold the products therebetween, and a collapsible and water-tight covering for the plates, the covered product-holding plates being adapted to be submerged with the interposed food products in a liquid refrigerant.

9. Apparatus for freezing food products, comprising superposed heat-conductive plates adapted to hold the product therebetween, means for drawing the plates together to engage the product with a predetermined pressure, and a collapsible and water-tight covering for the plates, the covered product-holding plates being adapted to be submerged in a liquid refrigerant.

10. Apparatus for freezing food products, comprising flat portable plates having clamping means therebetween for holding the plates in superposed position, and a flexible covering enveloping said superposed plates and their clamping means.

11. Apparatus for freezing food products, comprising portable rectangular plates of heat-conductive material, clamping mechanism for holding said plates in spaced superimposed position, and a flexible waterproof bag adapted to enclose said plates and having its mouth disposed beyond one end thereof.

12. Apparatus for freezing food products, comprising a tank for liquid refrigerant, in combination with a plurality of portable units, each consisting of spaced plates connected by adjusting means and enclosed in a waterproof envelope, and means for positioning the units in spaced relation within the tank.

KARL B. NORTON.